US008630296B2

(12) United States Patent
Nordmark et al.

(10) Patent No.: US 8,630,296 B2
(45) Date of Patent: Jan. 14, 2014

(54) SHARED AND SEPARATE NETWORK STACK INSTANCES

(75) Inventors: Erik Nordmark, Mountain View, CA (US); Sunay Tripathi, San Jose, CA (US); Nicolas G. Droux, Rio Rancho, NM (US)

(73) Assignee: Oracle America, Inc., Redwood Shores, CA (US)

( * ) Notice: Subject to any disclaimer, the term of this patent is extended or adjusted under 35 U.S.C. 154(b) by 1913 days.

(21) Appl. No.: 11/489,933

(22) Filed: Jul. 20, 2006

(65) Prior Publication Data

US 2008/0043755 A1     Feb. 21, 2008

(51) Int. Cl.
*H04L 12/28* (2006.01)
*H04Q 11/04* (2006.01)

(52) U.S. Cl.
CPC ................................ *H04Q 11/0478* (2013.01)
USPC .......... 370/395.53; 370/389; 370/392; 718/1; 718/105; 718/106

(58) Field of Classification Search
None
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,131,163 A | 10/2000 | Wiegel | |
| 6,163,539 A | 12/2000 | Alexander et al. | |
| 6,477,643 B1 | 11/2002 | Vorbach et al. | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 7,046,665 B1 | 5/2006 | Walrand et al. | |
| 7,146,431 B2 | 12/2006 | Hipp et al. | |
| 7,177,311 B1 | 2/2007 | Hussain et al. | |
| 7,257,815 B2* | 8/2007 | Gbadegesin et al. | 718/104 |
| 7,260,102 B2 | 8/2007 | Mehrvar et al. | |
| 7,313,142 B2 | 12/2007 | Matsuo et al. | |
| 7,424,710 B1* | 9/2008 | Nelson et al. | 718/1 |
| 7,471,689 B1* | 12/2008 | Tripathi et al. | 370/395.42 |
| 7,583,665 B1* | 9/2009 | Duncan et al. | 370/389 |
| 2002/0052972 A1 | 5/2002 | Yim | |
| 2003/0037154 A1 | 2/2003 | Poggio et al. | |
| 2004/0015966 A1* | 1/2004 | MacChiano et al. | 718/1 |
| 2004/0267866 A1 | 12/2004 | Carollo et al. | |
| 2005/0111455 A1 | 5/2005 | Nozue et al. | |
| 2005/0135243 A1 | 6/2005 | Lee et al. | |
| 2005/0138620 A1 | 6/2005 | Lewites | |
| 2006/0041667 A1 | 2/2006 | Ahn et al. | |
| 2006/0045089 A1* | 3/2006 | Bacher et al. | 370/392 |
| 2006/0070066 A1 | 3/2006 | Grobman | |
| 2006/0174324 A1 | 8/2006 | Zur et al. | |

OTHER PUBLICATIONS

"Solaris Networking—The Magic Revealed (Part I)"; Sunay Tripathi's Solaris Networking Weblog; Nov. 14, 2005, pp. 1-22 (22 pages).

Dovrolis, C., Thayer, B. and Ramanathan P.: "HIP: Hybrid Interrupt—Polling for the Network Interface", ACM SIGOPS Operating Systems Review, vol. 35, Iss. 4, Oct. 2001, (11 Pages).

* cited by examiner

*Primary Examiner* — Faruk Hamza
*Assistant Examiner* — Aixa A Guadalupe-Cruz
(74) *Attorney, Agent, or Firm* — Osha Liang LLP

(57) ABSTRACT

A method for configuring a packet destination, that includes creating the packet destination on a host, obtaining a network configuration for the packet destination, determining whether the host comprises a virtual network stack, where the virtual network stack includes the network configuration, and assigning the packet destination to the virtual network stack.

13 Claims, 4 Drawing Sheets

SHARED AND SEPARATE NETWORK STACK INSTANCES

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with U.S. application Ser. No. 11/112,367; "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; "Method and Apparatus for Dynamically Isolating Affected Services Under Denial of Service Attack" with U.S. application Ser. No. 11/112,158; "Method and Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112,328; "Hardware-Based Network Interface Per-Ring Resource Accounting" with U.S. application Ser. No. 11/112,222; "Dynamic Hardware Classification Engine Updating for a Network Interface" with U.S. application Ser. No. 11/112,934; "Network Interface Card Resource Mapping to Virtual Network Interface Cards" with U.S. application Ser. No. 11/112,063; "Network Interface Decryption and Classification Technique" with U.S. application Ser. No. 11/112,436; "Method and Apparatus for Enforcing Resource Utilization of a Container" with U.S. application Ser. No. 11/112,910; "Method and Apparatus for Enforcing Packet Destination Specific Priority Using Threads" with U.S. application Ser. No. 11/112,584; "Method and Apparatus for Processing Network Traffic Associated with Specific Protocols" with U.S. application Ser. No. 11/112,228.

The present application contains subject matter that may be related to the subject matter in the following U.S. applications filed on Oct. 21, 2005, and assigned to the assignee of the present application: "Method and Apparatus for Defending Against Denial of Service Attacks" with U.S. application Ser. No. 11/255,366; "Router Based Defense Against Denial of Service Attacks Using Dynamic Feedback from Attacked Host" with U.S. application Ser. No. 11/256,254; and "Method and Apparatus for Monitoring Packets at High Data Rates" with U.S. application Ser. No. 11/226,790.

The present application contains subject matter that may be related to the subject matter in the following U.S. applications filed on Jun. 30, 2006, and assigned to the assignee of the present application: "Network Interface Card Virtualization Based On Hardware Resources and Software Rings" issued as U.S. Pat. No. 7,672,299; "Method and System for Controlling Virtual Machine Bandwidth" issued as U.S. Pat. No. 7,613,132; "Virtual Switch" issued as U.S. Pat. No. 7,643,482; "System and Method for Virtual Network Interface Cards Based on Internet Protocol Addresses" issued as U.S. Pat. No. 7,684,423; "Virtual Network Interface Card Loopback Fastpath" issued as U.S. Pat. No. 7,630,368; "Bridging Network Components" issued as U.S. Pat. No. 7,634,608; "Reflecting the Bandwidth Assigned to a Virtual Network Interface Card Through Its Link Speed" issued as U.S. Pat. No. 7,792,140; "Method and Apparatus for Containing a Denial of Service Attack Using Hardware Resources on a Virtual Network Interface Card" issued as U.S. Pat. No. 7,966,401; "Virtual Network Interface Cards with VLAN Functionality" issued as U.S. Pat. No. 7,742,474; "Method and Apparatus for Dynamic Assignment of Network Interface Card Resources" issued as U.S. Pat. No. 7,613,198; "Generalized Serialization Queue Framework for Protocol Processing" issued as U.S. Pat. No. 7,715,416; "Serialization Queue Framework for Transmitting Packets" issued as U.S. Pat. No. 8,149,709.

The present application contains subject matter that may be related to the subject matter in the following U.S. applications filed on Jul. 20, 2006, and assigned to the assignee of the present application: "Low Impact Network Debugging" issued U.S. Pat. No. 8,050,266; "Reflecting Bandwidth and Priority in Network Attached Storage I/O" issued as U.S. Pat. No. 7,836,212; "Priority and Bandwidth Specification at Mount Time of NAS Device Volume" issued as U.S. Pat. No. 8,095,675; "Notifying Network Applications of Receive Overflow Conditions" issued as U.S. Pat. No. 8,036,127; "Host Operating System Bypass for Packets Destined for a Virtual Machine" issued as U.S. Pat. No. 8,005,022; "Multi-Level Packet Classification" issued as U.S. Pat. No. 7,848,331; "Method and System for Automatically Reflecting Hardware Resource Allocation Modifications" issued as U.S. Pat. No. 7,788,411; "Multiple Virtual Network Stack Instances Using Virtual Network Interface Cards" issued as U.S. Pat. No. 7,885,257; "Method and System for Network Configuration for Containers" issued as U.S. Pat. No. 7,912,926); "Network Memory Pools for Packet Destinations and Virtual Machines" issued as U.S. Pat. No. 8,392,565; "Method and System for Network Configuration for Virtual Machines" with U.S. application Ser. No. 11/489,923; and "Multiple Virtual Network Stack Instances" issued as U.S. Pat. No. 7,894,453.

BACKGROUND

Network traffic is transmitted over a network, such as the Internet, from a sending system (e.g., a computer system) to a receiving system (e.g., a computer system) via a network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine the connection associated with the packet.

Typically, the classifier includes a connection data structure that includes information about active connections on the receiving system. The connection data structure may include the following information about each active connection: (i) the queue associated with the connection and (ii) information necessary to process the packets on the queue associated with the connection. Depending on the implementation, the connection data structure may include additional information about each active connection. Such queues are typically implemented as first-in first-out (FIFO) queues and are bound to a specific central processing unit (CPU) on the receiving computer system. Thus, all packets for a given connection are placed in the same queue and are processed by the same CPU. In addition, each queue is typically configured to support multiple connections.

Once the classifier determines the connection associated with the packets, the packets are forwarded to a temporary data structure (e.g., a receive ring on the NIC) and an interrupt is issued to the CPU associated with the queue. In response to the interrupt, a thread associated with the CPU (to which the serialization queue is bound) retrieves the packets from the temporary data structure and places them in the appropriate queue. Once packets are placed in the queue, those packets are processed in due course. In some implementations, the queues are implemented such that only one thread is allowed to access a given queue at any given time.

SUMMARY

In general, in one aspect, the invention relates to a method for configuring a packet destination. The method comprises creating the packet destination on a host, obtaining a network configuration for the packet destination, determining whether the host comprises a virtual network stack, wherein the virtual network stack includes the network configuration, and assigning the packet destination to the virtual network stack.

In general, in one aspect, the invention relates to a method for configuring a packet destination. The method comprises creating the packet destination on a host, obtaining a network configuration for the packet destination, determining whether the host comprises a virtual network stack, wherein the virtual network stack includes the network configuration, if the host comprises the virtual network stack with the network configuration, assigning the packet destination to the virtual network stack, and if the host does not comprise the virtual network stack with the network configuration, creating a new virtual network stack, wherein the new network stack comprises the network configuration, and assigning the packet destination to the new virtual network stack.

In general, in one aspect, the invention relates to a system for configuring a packet destination. The system comprises a host comprising a virtual network stack, a shared virtual network stack, a first packet destination, a second packet destination, and a third packet destination, wherein the first packet destination is operatively connected to the virtual network stack, and wherein the second packet destination and the third packet destination are operatively connected to the shared virtual network stack.

Other aspects of the invention will be apparent from the following description and the appended claims.

DETAILED DESCRIPTION

Figure 1:
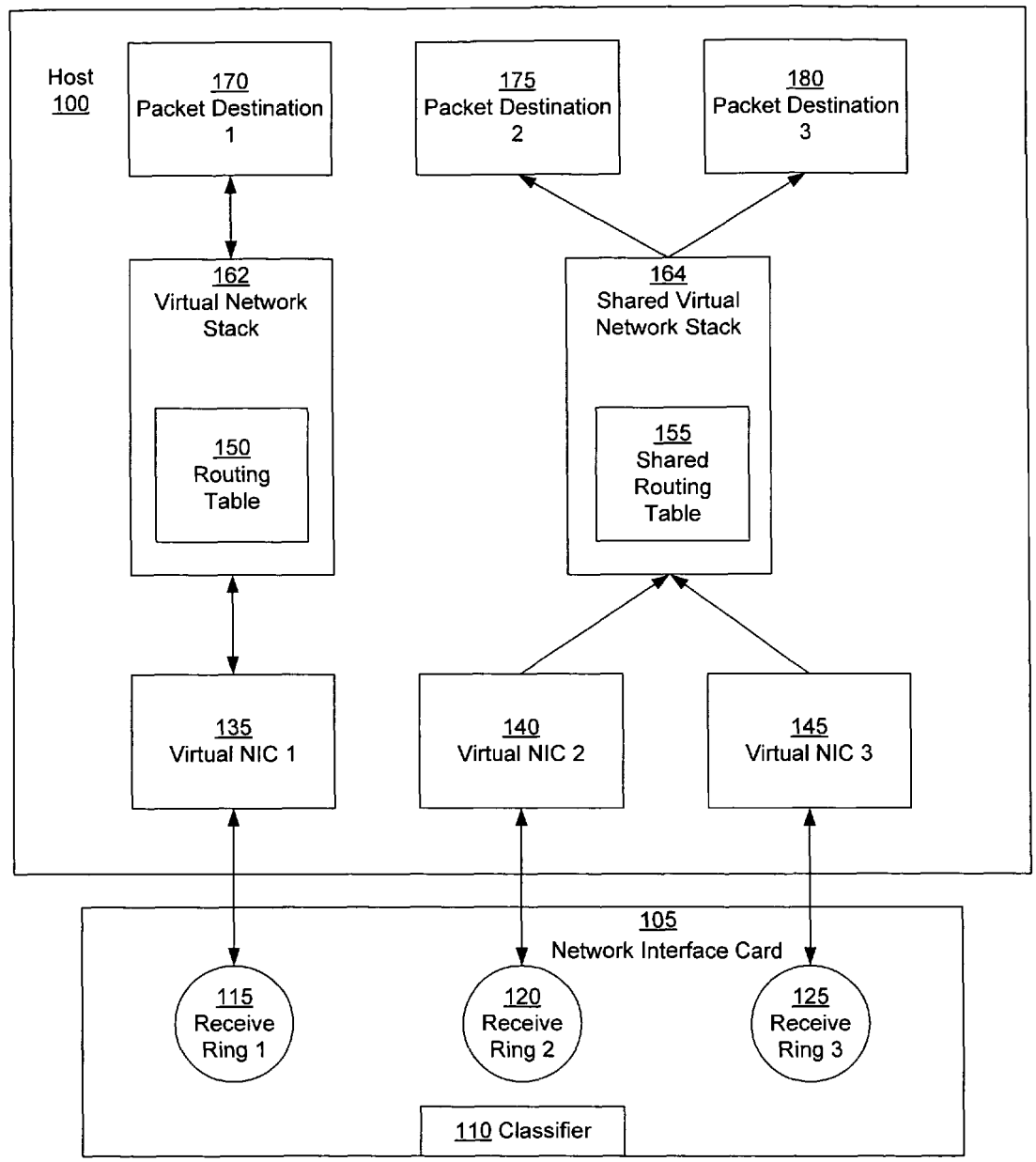
FIGS. 1-2 show schematic diagrams in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus to assign packet destinations to virtual network stacks. A packet destination may correspond to a container or a service; in addition, a packet destination is configured to send and receive packets over a network. In one embodiment of the invention, a virtual network stack implements a set of protocols used by a packet destination to transmit and receive packets to and from other hosts on the network.

Further, embodiments of the invention provide a method and apparatus to assign multiple packet destinations to a single virtual network stack, as well as assign a single packet destination to a single virtual network stack. In other words, packet destinations and virtual network stacks may have a many-to-one mapping or a one-to-one mapping. In one or more embodiments of the invention, a packet destination is assigned to a virtual network stack based on network configuration required by the packet destination. If no existing virtual network stack has a network configuration required by the packet destination, a new virtual network stack is created with the network configuration required by the packet destination.

In one embodiment of the invention, the network configuration is defined as one or more network parameters. The network parameter may correspond to any parameter that is associated with networking. Examples, of network parameters may include, but are not limited to, Media Access Control (MAC) address, Internet Protocol (IP) address, IP routing algorithm (e.g., Routing Information Protocol (RIP), Open Shortest Path First (OSPF), etc.), transport layer protocol (e.g., Transmission Control Protocol (TCP), User Datagram Protocol (UDP), IP routing table, default route (i.e., the route, set in the IP routing table, used when no other entry in the IP routing table matches the destination IP address of the packet), TCP parameters (i.e., parameters in the TCP that may be changed, for example, bandwidth-delay product, buffer size, etc.), IP parameters (i.e., parameters in the IP that may be changed), and TCP port number.

FIG. 1 shows a schematic diagram of a system in accordance with one or more embodiments of the invention. As shown in FIG. 1, the system includes a host (100), a network interface card (NIC) (105), a virtual network stack (162), a shared virtual network stack (164), multiple virtual NICs (e.g., virtual NIC 1 (135), virtual NIC 2 (140), virtual NIC 3 (145)), and multiple packet destinations (e.g., packet destination 1 (170), packet destination 2 (175), packet destination 3 (180)). Each of these components is described below.

The NIC (105) provides an interface between the host (100) and a network (not shown) (e.g., a local area network, a wide area network, a wireless network, etc.). More specifically, the NIC (105) includes a network interface (NI) (i.e., the hardware on the NIC used to interface with the network). For example, the NI may correspond to an RJ-45 connector, a wireless antenna, etc. The packets received by the NI are then forwarded to other components on the NIC (105) for processing. In one embodiment of the invention, the NIC (105) includes one or more receive rings (e.g., receive ring 1 (115), receive ring 2 (120), receive ring 3 (125)). In one embodiment of the invention, the receive rings (e.g., receive ring 1 (115), receive ring 2 (120), receive ring 3 (125)) correspond to portions of memory within the NIC (105) used to temporarily store packets received from the network. In one embodiment of the invention, the classifier (110) is configured to analyze the incoming network traffic, typically in the form of packets, received from the network (not shown).

In one embodiment of the invention, analyzing individual packets includes determining to which of the receive rings (e.g., receive ring 1 (115), receive ring 2 (120), receive ring 3 (125)) each packet is forwarded. In one embodiment of the invention, analyzing the packets by the classifier (110) includes analyzing one or more fields in each of the packets to determine to which of the receive rings (e.g., receive ring 1 (115), receive ring 2 (120), receive ring 3 (125)) the packets are forwarded. As an alternative, the classifier (110) may use the contents of one or more fields in each packet as an index into a data structure that includes information necessary to determine to which receive ring (e.g., receive ring 1 (115), receive ring 2 (120), receive ring 3 (125)) that packet is forwarded. The classifier (110) may also use other data found in the packet, such as the destination MAC address, to classify the packet. The classifier (110) may be implemented by a separate microprocessor embedded on the NIC (105). Alternatively, the classifier (110) may be implemented in software stored in memory (e.g., firmware, etc.) on the NIC (105) and executed by a microprocessor on the NIC (105).

In one or more embodiments of the invention, the host (100) may include a device driver (not shown) and one or more virtual NICs (e.g., virtual NIC 1(135), virtual NIC 2 (140), virtual NIC 3 (145)). In one embodiment of the invention, the device driver provides an interface between the receive rings (e.g., receive ring 1 (115), receive ring 2 (120), receive ring 3 (125)) and the host (100). More specifically, the device driver (not shown) exposes the receive rings (e.g., receive ring 1 (115), receive ring 2 (120), receive ring 3 (125)) to the host (100). In one embodiment of the invention, each of the virtual NICs (e.g., virtual NIC 1 (135), virtual NIC 2 (140), virtual NIC 3 (145)) is associated with one or more receive rings (e.g., receive ring 1 (115), receive ring 2 (120), receive ring 3 (125)). In other words, a virtual NIC (e.g., virtual NIC 1 (135), virtual NIC 2 (140), virtual NIC 3 (145)) receives incoming packets from a corresponding receive ring(s) (e.g., receive ring 1 (115), receive ring 2 (120), receive ring 3 (125)). In one or more embodiments of the invention, outgoing packets are forwarded from a virtual NIC (e.g., virtual NIC 1 (135), virtual NIC 2 (140), virtual NIC 3 (145)) to a corresponding transmit ring (not shown), which temporarily stores the packet before transmitting the packet over the network. In one or more embodiments of the invention, receive rings (e.g., virtual NIC 1(135), virtual NIC 2 (140), virtual NIC 3 (145)) and transmit rings (not shown) are implemented as ring buffers in the NIC (105).

In one or more embodiments of the invention, the virtual NICs (e.g., virtual NIC 1(135), virtual NIC 2 (140), virtual NIC 3 (145)) are operatively connected to packet destinations (e.g., packet destination 1 (170), packet destination 2 (175), packet destination 3 (180)), which include containers and applications, via virtual network stacks (e.g., virtual network stack (162), shared virtual network stack (164)). The virtual NICs (e.g., virtual NIC 1 (135), virtual NIC 2 (140), virtual NIC 3 (145)) provide an abstraction layer between the NIC (105) and the packet destinations (e.g., packet destination 1 (170), packet destination 2 (175), packet destination 3 (180)) on the host (100). More specifically, each virtual NIC (e.g., virtual NIC 1 (135), virtual NIC 2 (140), virtual NIC 3 (145)) operates like a NIC (105). For example, in one embodiment of the invention, each virtual NIC (e.g., virtual NIC 1(135), virtual NIC 2 (140), virtual NIC 3 (145)) is associated with one or more IP addresses, associated with one or more MAC addresses, optionally associated with one or more ports, and optionally configured to handle one or more protocol types. Thus, while the host (100) may be operatively connected to a single NIC (105), packet destinations (e.g., packet destination 1 (170), packet destination 2 (175), packet destination 3 (180)), such as containers or applications, executing on the host (100) operate as if the host (100) is bound to multiple NICs.

In one embodiment of the invention, each virtual network stack (e.g., virtual network stack (162), shared virtual network stack (164)) includes functionality to process packets in accordance with various protocols used to send and receive packets (e.g., Transmission Communication Protocol (TCP), Internet Protocol (IP), User Datagram Protocol (UDP), etc.). Further, each virtual network stack may also include functionality, as needed, to perform additional processing on the incoming and outgoing packets. This additional processing may include, but is not limited to, cryptographic processing, firewall routing, etc.

In one or more embodiments of the invention, the virtual network stacks (e.g., virtual network stack (162), shared virtual network stack (164)) correspond to network stacks with network layer and transport layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one embodiment of the invention, transport layer functionality corresponds to functionality to manage the transfer of packets on the network (e.g., functionality to support TCP, UDP, Stream Control Transmission Protocol (SCTP), etc.). In one or more embodiments of the invention, the virtual network stacks (e.g., virtual network stack (162), shared virtual network stack (164)) implement an IP layer (not shown) and a TCP layer (not shown). The virtual network stack (e.g., virtual network stack (162), shared virtual network stack (164)) is described in further detail in FIG. 2.

As shown in FIG. 1, the virtual network stacks (e.g., virtual network stack (162), shared virtual network stack (164)) can be assigned to one packet destination (e.g., packet destination 1 (170)) or multiple packet destinations (e.g., packet destination 2 (175), packet destination 3 (180)). In other words, a shared network stack (164) is mapped to many packet destinations (e.g., packet destination 2 (175), packet destination 3 (180)), whereas a virtual network stack (162) is mapped to only one packet destination (e.g., packet destination 1 (170)).

As discussed above, the host (100) includes one or more packet destinations (170, 175, 180). In one embodiment of the invention, the packet destination(s) (170, 175, 180) correspond to any process (or group of processes) executing on the host that is configured to send and/or receive network traffic. Further, the packet destination(s) (170, 175, 180) does not include an internal network stack (i.e., there is no network stack within the packet destination(s)). Examples of packet destinations (170, 175, 180) include, but are not limited to, containers, services (e.g., web server), etc.

In one or more embodiments of the invention, packet destinations (e.g., packet destination 1 (170), packet destination 2 (175), packet destination 3 (180)) are assigned to virtual network stacks (e.g., virtual network stack (162), shared virtual network stack (164)) based on network configuration. Packet destinations (e.g., packet destination 1 (170), packet destination 2 (175), packet destination 3 (180)) with the same or similar network configurations are assigned the same virtual network stack (e.g., shared virtual network stack (164)) to reduce management overhead and save resources. When a new packet destination (e.g., packet destination 1 (170), packet destination 2 (175), packet destination 3 (180)) is created, the host (100) first checks the existing virtual network stacks (e.g., virtual network stack (162), shared virtual network stack (164)) for the packet destination's network configuration. If a virtual network stack (e.g., virtual network stack (162), shared virtual network stack (164)) is found with the same or a similar network configuration to that of the packet destination's (e.g., packet destination 1 (170), packet destination 2 (175), packet destination 3 (180)), the packet destination is assigned to the virtual network stack. Otherwise, a new virtual network stack (e.g., virtual network stack (162), shared virtual network stack (164)) is created with the packet destination's (e.g., packet destination 1 (170), packet destination 2 (175), packet destination 3 (180)) network configuration, and the packet destination is assigned to the new virtual network stack.

As shown in FIG. 1, each virtual network stack (162m 164), includes a routing table (e.g., routing table (150), shared routing table (155)). If virtual network stack is mapped to a single packet destination, then the routing table (e.g., 150) includes entries used by the packet destination (e.g., packet destination 1(170)). Alternatively, if the virtual network stack is mapped to multiple packet destinations, then the routing table is a shared routing table (e.g., 155). In the case of a shared routing table, the entries in the shared routing table are used by all packet destinations associated with the virtual network stack.

Regardless of whether the routing table is shared or not shared, the routing table is used to direct outgoing packets by matching destination addresses on the packets to the network paths used to reach them. In one or more embodiments of the invention, the routing table (e.g., routing table (150), shared routing table (155)) lists the next hop to a destination. A virtual network stack (e.g., virtual network stack (162), shared virtual network stack (164)) receives an outgoing packet, looks up the destination address in the packet header, and queries the routing table (e.g., routing table (150), shared routing table (155)) for a routing entry associated with the destination address. The packet is then sent through a virtual NIC (e.g., virtual NIC 1 (135), virtual NIC 2 (140), virtual NIC 3 (145)) to the NIC (105), where the packet is sent to the next hop in the network path to the destination address.

In one or more embodiments of the invention, a routing table (e.g., routing table (150), shared routing table (155)) is created by a routing protocol. A routing protocol determines the next hop in the network path using a shortest path algorithm, such as Dijkstra's algorithm, and fills in the routing table with the next hop for any given destination address. Routing protocols include Open Shortest Path First (OSPF), Routing Information Protocol (RIP), and Intermediate System to Intermediate System (IS-IS). Different routing protocols are used based on the type of network the packets are transmitted over. In addition, each routing protocol uses routing metrics, such as bandwidth, delay, hop count, path cost, load, Maximum Transmission Unit (MTU), reliability, and communication costs, to determine which route to send packets along.

In one or more embodiments of the invention, packet destinations (e.g., packet destination 1 (170), packet destination 2 (175), packet destination 3 (180)) that send packets to similar destination addresses or over the same networks will use the same routing protocol and/or routing table (e.g., shared routing table (155)). For example, packet destination 2 (175) and packet destination 3 (180) use the shared routing table (155) to route outgoing packets; packet destination 2 (175) and packet destination 3 (180) may also use the same routing protocol to route outgoing packets. On the other hand, packet destination 1 (170) uses its own routing table (150) and possibly its own routing protocol. As a result, packet destination 2 (175) and packet destination 3 (180) are both assigned to the shared virtual network stack (164), while packet destination 1 (170) is assigned by itself to the virtual network stack (162). In one or more embodiments of the invention, packet destination 2 (175) is associated with virtual NIC 2 (140), and packet destination 3 (180) is associated with virtual NIC 3 (145).

In one embodiment of the invention, in addition to using network parameters, Task ID and/or project ID may also be used in determining whether two (or more) packet destinations may be assigned to the same virtual network stack. Task ID and project ID relate to a workload hierarchy on the host (100). In one or more embodiments of the invention, a workload hierarchy is used to organize the processes on the host (100). A project refers to a collection of tasks that represents an entire workload. For example, a project may include all threads running on an enterprise application. A task refers to a collection of processes that represents a workload component. For example, a task may involve all threads that handle login and logout procedures for the enterprise application.

In one or more embodiments of the invention, a packet destination (e.g., packet destination 1 (170), packet destination 2 (175), packet destination 3 (180)) is associated with a task ID and a project ID, which relate the packet destination to a particular task and project. Other packet destinations (e.g., packet destination 1 (170), packet destination 2 (175), packet destination 3 (180)) with the same task ID and/or project ID are part of the same task and/or project. In addition, a packet destination (e.g., packet destination 1 (170), packet destination 2 (175), packet destination 3 (180)) may be assigned to a virtual network stack (e.g., virtual network stack (162), shared virtual network stack (164)) based on task ID or project ID.

In one embodiment of the invention, packet destinations (e.g., packet destination 1 (170), packet destination 2 (175), packet destination 3 (180)) grouped according to task and/or project perform similar functions, and that the grouped processes are likely to use similar or identical network configurations. Accordingly, task ID and project ID may be viewed as metrics for identifying similar or identical network configurations among packet destinations (e.g., packet destination 1 (170), packet destination 2 (175), packet destination 3 (180)). Therefore, in one or more embodiments of the invention, packet destinations with the same task ID and/or project ID are assigned to the same virtual network stack (e.g., virtual network stack (162), shared virtual network stack (164)).

Figure 2:
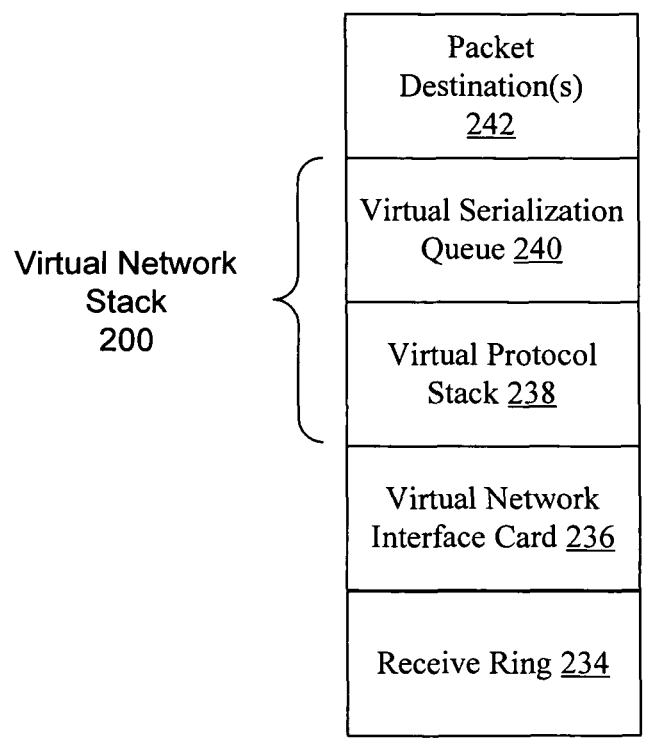

FIG. 2 shows a virtual network stack in accordance with one or more embodiments of the invention. Various components described above in FIG. 1 may be collectively referred to as a virtual network stack (200). In one embodiment of the invention, the virtual network stack (200) includes a virtual protocol stack (238), and a virtual serialization queue (240). In one embodiment of the invention, the virtual network stack (200) may be bound to one or more receive rings (234) via a virtual NIC (236). Further, the virtual network stack (200) may be bound to one or more packet destinations (242) (e.g., containers and/or services). All of the aforementioned components in the virtual network stack (200) are bound together such that a packet received by the virtual NIC (236) of a particular virtual network stack (200) is forwarded through the other components of the virtual network stack (200) until the packet reaches the packet destination (242) (e.g., containers and/or services) associated with the particular virtual network stack (200).

In one embodiment of the invention, the host includes multiple virtual network stacks (200), each of which includes a virtual protocol stack (238), and a virtual serialization queue (240). A virtual protocol stack (238) implements a protocol suite needed to transmit and receive packets from other hosts. The protocol suite may include TCP, IP, HyperText Transfer Protocol (HTTP), UDP, or other protocols for transmitting packets over a network. A virtual serialization queue (240) is a data structure for serializing incoming and outgoing packets in the virtual network stack (200). In one or more embodiments of the invention, one virtual serialization queue (240) is used for incoming packets, and a separate virtual serialization queue (240) is used for outgoing packets. Alternatively, a bidirectional virtual serialization queue (240) is used for both incoming and outgoing packets.

In addition, a virtual network stack (200) may be associated with multiple packet destinations (242). Each of these packet destinations (242) is associated with one or more virtual NICs (236). In one or more embodiments of the invention, packet destinations (242) are assigned to virtual network stacks (200) based on network configuration. Packet destinations (242) with similar or identical network configurations are assigned to the same virtual network stack (200), and packet destinations (242) with unique network configurations are assigned to new virtual network stacks (200) with the unique network configurations. In one or more embodiments of the invention, packet destinations (242) are assigned to virtual network stacks (200) using a set of metrics. For example, a virtual network stack (200) may be created for each of four common routing protocols, such as OSPF, RIP, Border Gateway Protocol (BGP), and IS-IS. The packet destinations (242) are then assigned to one of the four virtual network stacks (200) based on routing protocol, and no new virtual network stacks (200) are created beyond the aforementioned four virtual network stacks. Alternatively, packet destinations (242) may be grouped according to other criteria, such as routing table, task ID, or project ID; each group is then assigned a virtual network stack (200) with a network configuration suitable for servicing the group.

Figure 3:
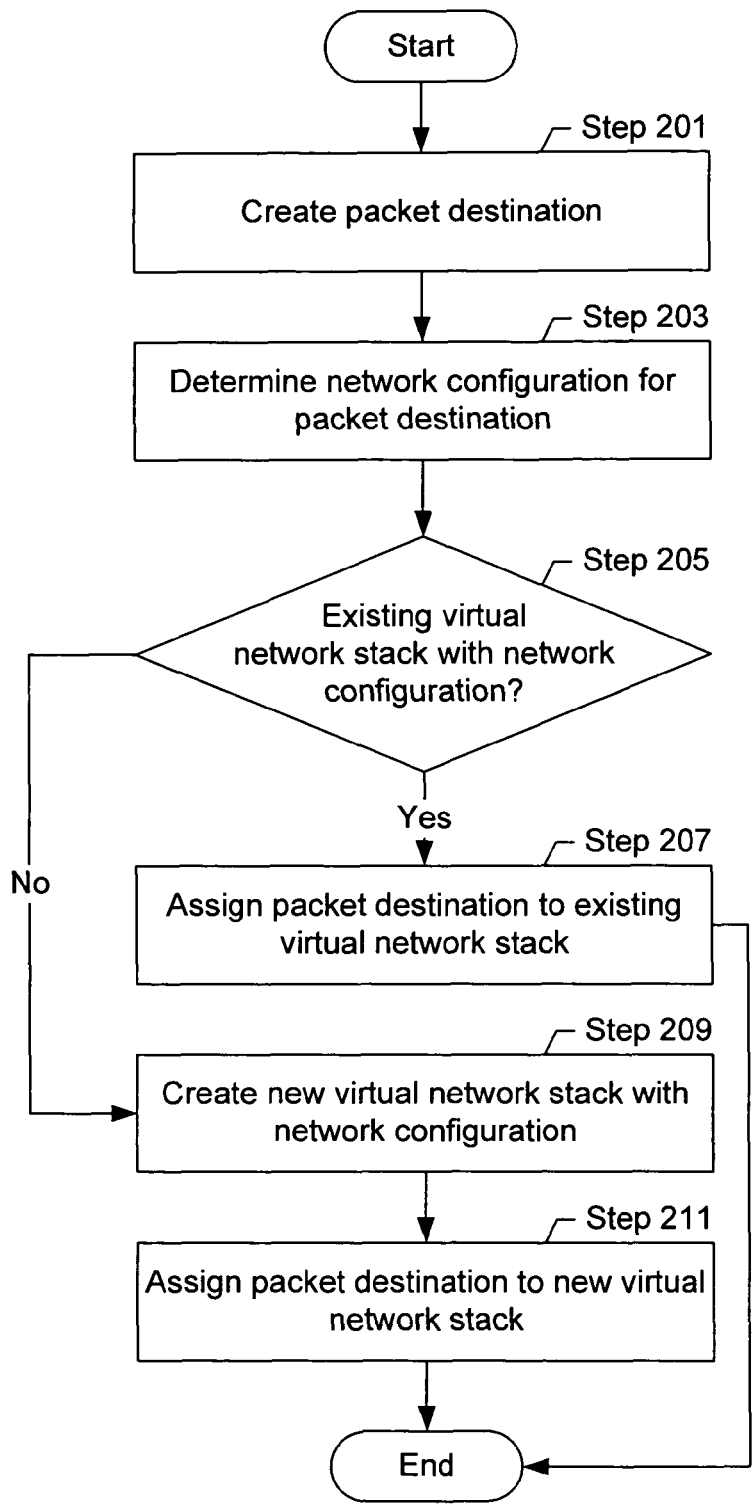
FIG. 3 shows a flow diagram in accordance with one or more embodiments of the invention.

FIG. 3 shows a flow diagram in accordance with one or more embodiments of the invention. First, a packet destination is created (Step 201). Once the packet destination is created, a network configuration for the packet destination is determined (Step 203). For example, a packet destination may need a specific routing table for directing packets to other hosts on the network or a specific routing protocol for accessing an intranet (e.g., an interior gateway protocol (IGP)). The network configuration may contain a varying number of network parameters, depending on how specific the needs of the packet destination are and how limited the resources of the host are. For example, a host with hundreds of packet destinations is more likely to limit the variety of virtual network stacks than a host with only ten packet destinations.

Once a network configuration for the packet destination is established, a determination is made about whether an existing virtual network stack includes the network configuration (Step 205). As stated above, the virtual network stack may have to match every element in the packet destination's network configuration, or the virtual network stack may match only one property of the packet destination's network configuration. Further, as discussed above, an identifier such as task ID or project ID may also be used to associate the packet destination with a given virtual network stack. If an existing virtual network stack matches the packet destination's network configuration, the packet destination is assigned to the existing virtual network stack (Step 207). Otherwise, a new virtual network stack is created with the packet destination's network configuration (Step 209), and the packet destination is assigned to the new virtual network stack (Step 211).

Using FIG. 1 as an example, consider the creation of a new packet destination within the host (100). Based on the characteristics of the new packet destination, a network configuration is determined for the new packet destination. The host (100) then analyzes the virtual network stack (162) and the shared virtual network stack (164) for their network configurations. As stated above, only a few of the criteria have to match the new packet destination's network configuration, or all of the properties of the network configuration have to be present in the virtual network stack (e.g., virtual network stack (162), shared virtual network stack (164)).

If a virtual network stack (e.g., virtual network stack (162), shared virtual network stack (164)) is found that matches the network configuration, the new packet destination is assigned to the virtual network stack. For example, if the network stack (162) contains the appropriate network configuration, the new packet destination is operatively connected to the network stack (162), and a virtual NIC corresponding to the new packet destination is created and associated with the virtual network stack (162). The new packet destination then shares the virtual network stack (162) with packet destination 1 (170). On the other hand, if no existing virtual network stack (e.g., virtual network stack (162), shared virtual network stack (164)) includes a suitable network configuration, a new virtual network stack is created with the network configuration of the new packet destination. Packets bound for the new packet destination would then travel through the NIC (105), where they are placed in a receive ring (e.g., receive ring 1 (115), receive ring 2 (120), receive ring 3 (125)). A virtual NIC (e.g., virtual NIC 1 (135), virtual NIC 2 (140), virtual NIC 3 (145)) corresponding to the new packet destination sends the packets from the receive ring to the new virtual network stack, where the packets are processed. Once processed, the packets arrive at the new packet destination.

Figure 4:
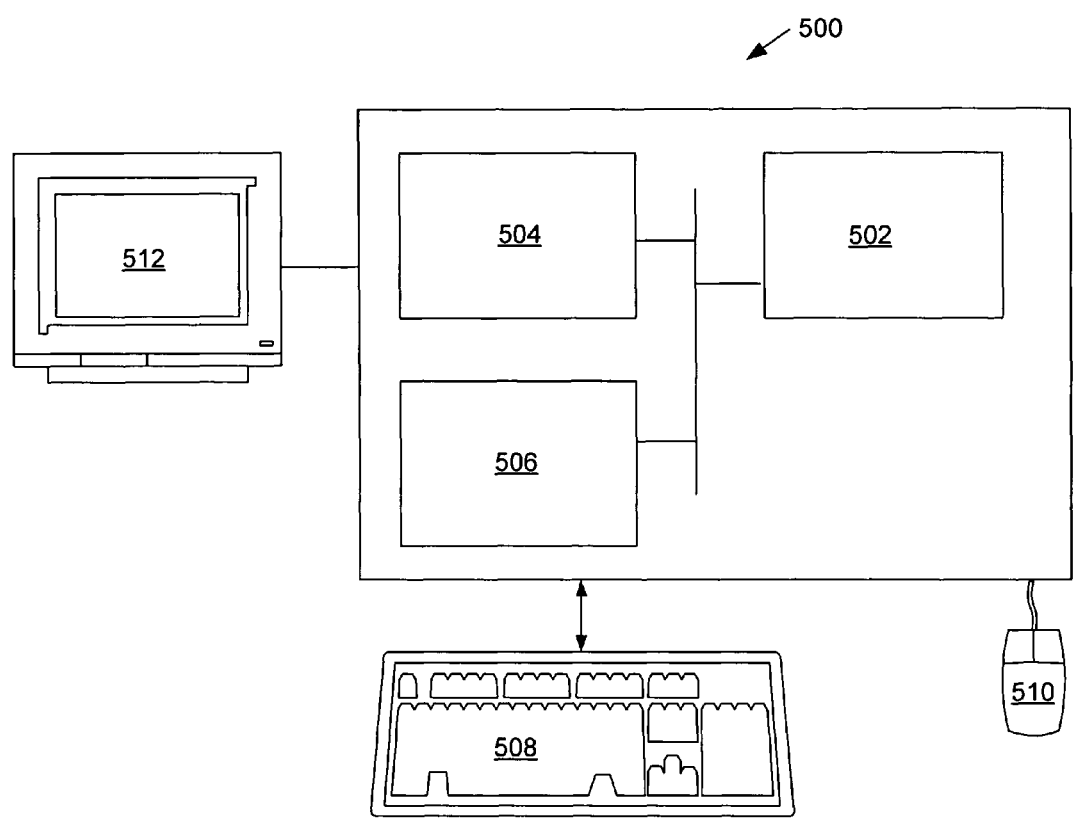
FIG. 4 shows a computer system in accordance with one or more embodiments of the invention.

The invention may be implemented on virtually any type of computer regardless of the platform being used. For example, as shown in FIG. 4, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., virtual network stack, shared virtual network stack, packet destination, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for configuring packet destinations, comprising:
creating a first packet destination on a host;
obtaining a first network configuration for the first packet destination;
making a first determination that the host does not comprise a virtual network stack which includes the first network configuration, wherein the first packet destination is associated with a project ID and a task ID, and wherein the project ID and the task ID are used to determine whether the host comprises the virtual network stack;
creating, in response to the first determination, the virtual network stack which includes the first network configuration;
assigning, in response to the creating, the first packet destination to the virtual network stack;
assigning the first packet destination to a first virtual network interface card (VNIC);
receiving, by the first VNIC, a first plurality of packets from a first receive ring on a physical network interface card (NIC), wherein the first plurality of packets is addressed to the first packet destination;
forwarding, by the first VNIC, the first plurality of packets to the first packet destination via the shared virtual network stack;
creating a second packet destination on a host;
obtaining a second network configuration for the second packet destination;
making a second determination that the virtual network stack includes the second network configuration;
assigning, in response to the second determination, the second packet destination to the virtual network stack;
assigning the second packet destination to a second VNIC;
receiving, by the second VNIC, a second plurality of packets from a second receive ring on the NIC, wherein the second plurality of packets is addressed to the second packet destination; and
forwarding, by the second VNIC, the second plurality of packets to the second packet destination via the virtual network stack.

2. The method of claim 1, wherein the first network configuration comprises a routing table.

3. The method of claim 1, wherein the first network configuration comprises a routing protocol.

4. The method of claim 1, wherein the first packet destination is one selected from a group consisting of a container and a service.

5. A non-transitory computer readable storage medium comprising software instructions, which when executed by a processor, perform a method for configuring packet destinations, the method comprising:
creating a first packet destination on a host;
obtaining a first network configuration for the first packet destination;
making a first determination that the host does not comprise a virtual network stack which includes the first network configuration, wherein the first packet destination is associated with a project ID and a task ID, and wherein the project ID and the task ID are used to determine whether the host comprises the virtual network stack;
creating, in response to the first determination, the virtual network stack which includes the first network configuration;
assigning, in response to the creating, the first packet destination to the virtual network stack;
assigning the first packet destination to a first virtual network interface card (VNIC);
receiving, by the first VNIC, a first plurality of packets from a first receive ring on a physical network interface card (NIC), wherein the first plurality of packets is addressed to the first packet destination;
forwarding, by the first VNIC, the first plurality of packets to the first packet destination via the shared virtual network stack;
creating a second packet destination on a host;
obtaining a second network configuration for the second packet destination;
making a second determination that the virtual network stack includes the second network configuration;
assigning, in response to the second determination, the second packet destination to the virtual network stack;
assigning the second packet destination to a second VNIC;
receiving, by the second VNIC, a second plurality of packets from a second receive ring on the NIC, wherein the second plurality of packets is addressed to the second packet destination; and
forwarding, by the second VNIC, the second plurality of packets to the second packet destination via the virtual network stack.

6. The non-transitory computer readable storage of claim 5, wherein the first network configuration comprises a routing table.

7. The non-transitory computer readable storage of claim 5, wherein the first network configuration comprises a routing protocol.

8. The non-transitory computer readable storage of claim 5, wherein the first packet destination is one selected from a group consisting of a container and a service.

9. A system for configuring a packet destination, comprising:
a host, comprising:
a first virtual network stack comprising a first network configuration;
a first packet destination;
a first virtual network interface card (VNIC) associated with the first packet destination and operatively connected to the first virtual network stack, wherein the first VNIC is configured to:
receive a first plurality of packets from a first receive ring on a physical network interface card (NIC), wherein the first plurality of packets is addressed to the first packet destination, and
forward the first plurality of packets to the first packet destination via the first virtual network stack;
a second packet destination;
a third packet destination;
a storage medium comprising software instructions, which when executed by a processor, perform a method, the method comprising:
obtaining a second network configuration for the second packet destination;
making a first determination that the first virtual network stack does not include the second network configuration, wherein the first packet destination is associated with a project ID and a task ID and wherein the project ID and task ID are used to determine whether the host comprises the virtual network stack;

creating, in response to the first determination, a second virtual network stack which includes the second network configuration;

assigning, in response to the creating, the second packet destination to the second virtual network stack;

obtaining a third network configuration for the third packet destination;

making a second determination that the second virtual network stack includes the third network configuration; and assigning, in response to the second determination, the third packet destination to the second virtual network stack a second VNIC configured to:

receive a second plurality of packets from a second receive ring on the NIC, wherein the second plurality of packets is addressed to the second packet destination, and forward the second plurality of packets to the second packet destination via the second virtual network stack; and a third VNIC configured to:

receive a third plurality of packets from a third receive ring on the NIC, wherein the third plurality of packets is addressed to the third packet destination, and forward the third plurality of packets to the third packet destination via the second virtual network stack.

10. The system of claim 9, wherein the second virtual network stack comprises:

a shared routing table, wherein the shared routing table is used by the second packet destination and the third packet destination.

11. The system of claim 9, wherein the first virtual network stack comprises:

a routing table, wherein the routing table is used by the first packet destination.

12. The system of claim 9, wherein the second VNIC and the third VNIC are operatively connected to the second virtual network stack.

13. The system of claim 9, wherein the second packet destination and the third packet destination are associated with a routing protocol.

* * * * *